United States Patent [19]
Homonoff et al.

[11] Patent Number: 4,765,812
[45] Date of Patent: Aug. 23, 1988

[54] AIR LAID FILTERING MATERIAL

[75] Inventors: Edward C. Homonoff, Windham, Conn.; Clarke A. Rodman, East Providence, R.I.

[73] Assignee: Allied-Signal Inc., Morristown, N.J.

[21] Appl. No.: 114,489

[22] Filed: Oct. 30, 1987

[51] Int. Cl.$^4$ .............................................. B01D 46/02
[52] U.S. Cl. ........................................ 55/524; 55/528; 428/283
[58] Field of Search ........... 55/524, 527, 528, DIG. 5; 428/283

[56] References Cited

U.S. PATENT DOCUMENTS

| | | |
|---|---|---|
| 2,692,654 | 10/1954 | Pryor . |
| 3,023,839 | 3/1962 | Best . |
| 3,158,532 | 11/1964 | Pall et al. . |
| 3,238,056 | 3/1966 | Pall et al. . |
| 3,251,475 | 5/1966 | Till et al. . |
| 3,594,993 | 7/1971 | Heyse . |
| 3,826,067 | 7/1974 | Wilder et al. . |
| 4,007,114 | 2/1977 | Ostreicher . |
| 4,100,324 | 7/1978 | Anderson et al. . |
| 4,160,059 | 7/1979 | Samejims . |
| 4,286,977 | 8/1981 | Klein . |
| 4,293,378 | 10/1981 | Klein . |
| 4,495,030 | 1/1985 | Giglia . |
| 4,523,995 | 6/1985 | Pall et al. . |
| 4,540,625 | 9/1985 | Sherwood ........................... 428/283 |
| 4,612,237 | 8/1986 | Frankenburg . |
| 4,629,474 | 12/1986 | Thornton . |
| 4,636,231 | 1/1987 | Thornton et al. ................ 55/528 X |
| 4,661,132 | 4/1987 | Thornton et al. ................ 55/528 X |

Primary Examiner—Charles Hart
Attorney, Agent, or Firm—Ken C. Decker; William N. Antonis

[57] ABSTRACT

Filtering media consist of formable air laid batting comprising a thermoplastic or thermosetting binder resin and a fiber mixture comprising coarse fibers, such as wood pulp and man-made fibers, having a diameter of at least 20 microns, and fiberglass or other fibers having a diameter of less than about 3 microns.

13 Claims, 1 Drawing Sheet

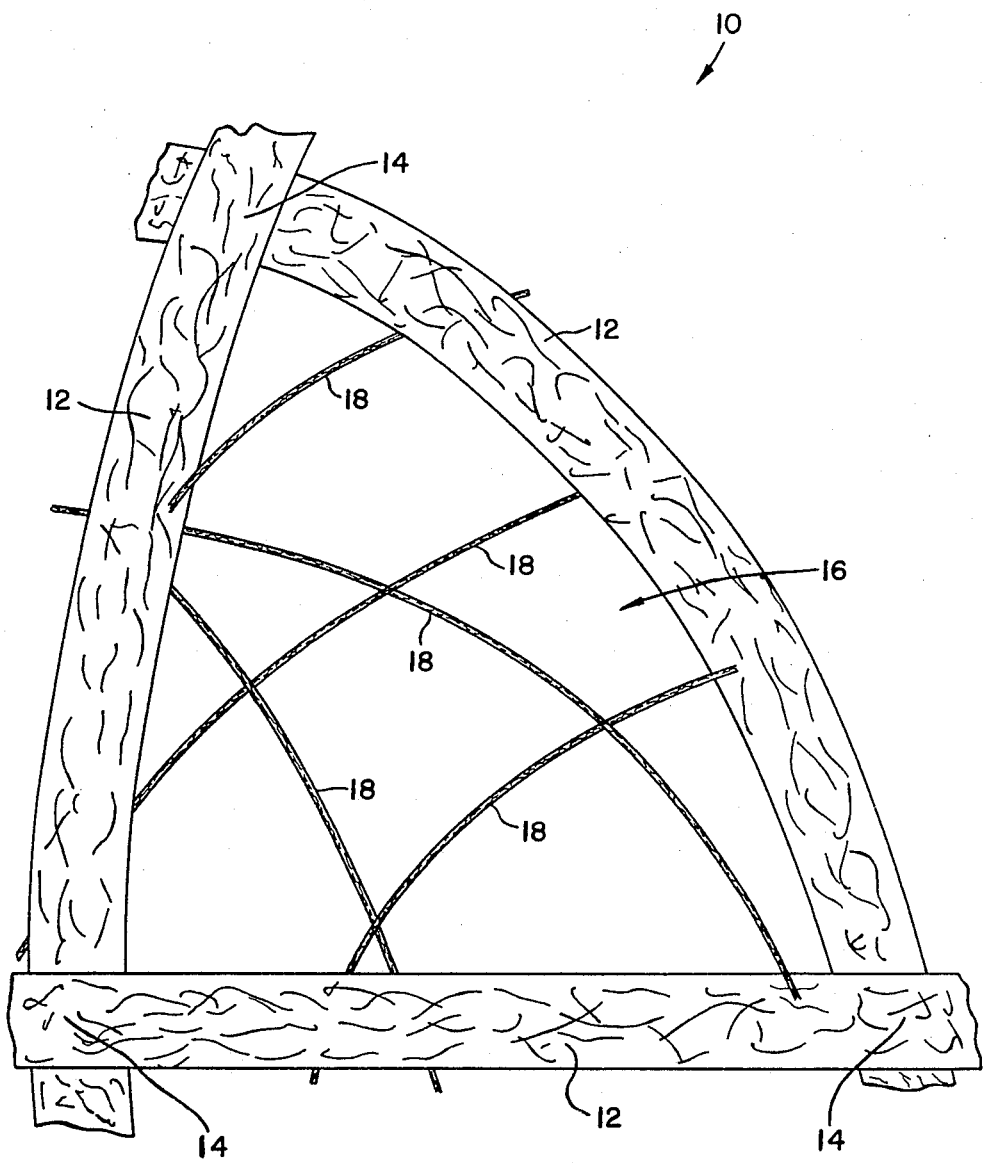

AIR LAID FILTERING MATERIAL

This invention relates to an air laid, nonwoven, fibrous filtering medium which may be used to filter either gases or liquids.

Filters have been used to remove contaminants from the combustion air and lubricating oil of internal combustion engines for many years. The filtering media used in these filters is most commonly a filtering paper made by a wet laid, papermaking process. However, more recently air laid mats, made by processes disclosed, for example, in U.S. Pat. Nos. 3,918,126 and 4,352,649, have been proposed. The wet laid filtering paper is a "surface" filtering medium; that is, it removes contaminant particles from the fluid being filtered by sieving the particles, thereby trapping the particles on one surface of the filtering paper while permitting the fluid filtrate to pass therethrough. Wetlaid filtering papers have a relatively high efficiency; that is, they are quite effective in removing particulate contaminants from the liquid filtrate. However, it is also desirable that a filtering medium have a relatively high capacity without being unduly restrictive. In other words, the capacity, or the amount of contaminants that the filtering media can hold before plugging must be reasonably large without being unduly restrictive of the flow of the fluid filtrate through the medium. Obviously, for example, a filter for filtering the inlet air of an internal combustion engine cannot unduly restrict the air flow to the engine without severely damaging the engine, yet the filtering media must have the capacity to hold a large volume of particulate contaminants. Since both type of media are made by fibers, and since fibers are generally sold by weight, it is also desirable to minimize the basis weight (that is, the weight per unit of surface area) while maximizing the efficiency and capacity of the filtering medium.

Batts of air laid fibers provide a so-called "depth type" filtering media. That is, since the air laying process can be adjusted to form batts having a significant percentage of the fibers comprising the batts arrayed in all three spatial dimensions, a three dimensional matrix or structure is formed which has pores formed by the intersections of the relatively short fibers used to make the batt spread throughout the depth of the filtering medium. Accordingly, air laid filtering media does not depend upon sieving particulate contaminants from the filtrate at the surface of the filter; instead, the particulate contaminants are entrained in the pores formed by the intersections of the fibers due to adherence of the particles to the fibers. Since the air laid media is a relatively open structure, capacity is maximized and restriction is minimized, and the air laid media is relatively efficient. In general, air laid media has heretofore been formed generally from wood pulp fibers, since they are relatively inexpensive and have good filtering characteristics. Such wood pulp fibers have a diameter generally much greater than 20 microns. Still another advantage of the air laid filtering media over the wet laid paper filtering media is that the cost of manufacturing the air laid media is generally less, because of the lower capital investment required for air laying machinery and the fact that the energy requirements for air laid media are much less than that of the wet laid paper media, since energy is required in the papermaking process to dry the media. Air laid media is also generally impregnated with a resin, which acts as a glue, holding the fibers together, thus facilitating handling of the media and also fixing the pore sizes formed by the fibers.

The present invention relates to an air laid filtering medium in which small diameter fibers, are mixed with the coarse fibers used in the prior art air laid mats. The microfibers are generally fiberglass having diameters from about 0.5 microns to about 3 microns. This mixture of fibers provides an air laid media with very fine pore structure, thereby making the media extremely efficient compared to prior art media, while retaining the high void volume inherent in prior art air laid filtering media to thereby maximize capacity of the media while minimizing restriction. Although wet laid paper filtering media have been made which use the fine diameter fiberglass, the waterlaid structures are nearly two dimensional, (as compared to the three dimensional structure of the air laid media), have much higher density or basis weight, and require almost twice the amount of microfiber to achieve the desired efficiency than is required in the air laid media, while providing less contaminant holding capacity of the lower density (or lower basis weight) air laid medium.

In retrospect, this unexpected phenomena is attributed to the greater accessibility of the microfibers in the air laid media, which lie in a three-dimensional array. In the wet laid, paper filtering medium, the microfibers are permitted to lay in substantially only two dimensions. Since the air laid media inherently has a greater void volume (that is, the volume between fibers through which the filtrate passes) and has less matting tendency than the wet laid media, the microdiameter fibers allow for the contaminant particulates to be held within the void spaces without premature plugging which reduces capacity and tends to increase restriction. The synergistic effect of using both the larger diameter fibers and the smaller diameter microfibers results in these unexpected properties because the large diameter or coarse fibers have the ability to hold the fine diameter fibers in place. The fine diameter fibers thus subdivide the pores formed by the large diameter fibers.

If only small diameter fibers would be used, the small diameter fibers do not have sufficient strength to form a batt with the necessary large void volume and would also have pore sizes reduced to an unacceptable level. Such batts would also be extremely expensive. The larger fibers form large pores, and the microfibers subdivide the large pores formed by the coarse fibers into smaller pores. The result is that pore size is relatively small, since the microfibers are supported within the pores formed by the coarse fibers, while the high void volume of batts formed by large fibers is retained. In other words, an effective small pore size is obtained, with its attendant benefits in increasing efficiency, while still having the bulk of the fibers in the batt of the coarse type having a relatively large diameter, thus retaining a low basis rate and consequent lower cost.

These and other benefits of the invention will become apparent from the following description, with reference to the accompanying drawing, the sole FIGURE of which is a pore formed by the fibers used in the filtering media of the present invention, magnified many times.

The present invention comprises an air laid filtering material which includes from about 10% to about 20% of a binder material, such as a thermoplastic or thermosetting resin, and from about 80% to about 90% of a fiber mixture. All percentages given in this description are in percents by weight. The fiber mixture is pneumatically conveyed and deposited on a moving screen using the process and apparatus described in one of the patents referred to hereinabove. Regardless of the air laying process used, the apparatus is adjusted so that a substantial portion of the fibers are oriented in each of the three spatial dimensions, so that a three dimensional matrix structure is formed in a manner well known to those skilled in the art. The fibers cross each other randomly, thereby forming pores which extend through the depth of the medium. The resin is then applied to the medium after it is formed in a manner well known to those skilled in the art. Although any suitable resin may be employed, a typical resin that might be employed is Union Carbide 828 polyvinyl acetate, available commercially from Union Carbide Corporation.

The coarse fibers in the fiber mixture generally have a diameter of at least 20 microns. Because of its relatively low cost and relatively good filtering properties, the bulk of the coarse fibers would generally be wood pulp fibers, although certain filter applications may require fibers other than wood pulp. For example, filters used in extremely high temperature applications may have coarse fibers comprised of fiberglass. Even when wood pulp fibers are used, it is desirable to include from about 5% to about 20% of the fiber mixture of man-made fibers, such as rayon or polyester, to give the media strength and to enhance certain filtering properties. Accordingly, the preferred media will have from about 55% to about 70% wood pulp fibers, from about 5% to about 20% man-made fibers, such as rayon or polyester, and from about 5% to about 25% microglass fiberglass fibers having a diameter of less than about 3 microns, but preferably having a diameter in the range from about one-half to about three microns. Based on tests, it has been found that reducing the content of the microglass or fine fiberglass fibers to less than 5% greatly diminishes the enhanced filtration characteristics described above of media including microglass, and that including fine diameter fiberglass fibers in amounts greater than 25% by weight does not increase filtering performance.

Referring now to the drawing, a cross-section of a typical pore in the media formed by the aforementioned fiber mixture is illustrated magnified many times. The pore is indicated by the reference numeral 10. The wood pulp fibers 12 cross each other at 14, thus forming a pore generally indicated by the numeral 16. Although it is possible only to illustrate the pore in two dimensions in the drawing, it will, of course, be recognized that the pore 16 is a three dimensional structure formed by the crossings of many of the wood pulp fibers 12. The wood pulp fibers 12 support the fine diameter fiberglass fibers 18 within the pore 16. Accordingly, the microglass or small diameter fiberglass fibers 18 divide the pore 16 into many subpores. The fine diameter fiberglass fibers 18 cross the wood pulp fibers 12 and thus are supported by the wood pulp fibers because of electrostatic attraction between the fibers. Accordingly, a structure is formed having a relatively small pore size, since the effective pore size of the filtering media is governed by the size of the subdivided pores formed by the fine diameter fiberglass 18. However, because the diameter of the fiberglass is so small and the fiberglass fibers are held in place within the pore 16 by the coarse fibers 12, the inclusion of the fiberglass fibers 18 provides only a small increase in the restriction to fluid flow through the pores. However, by subdividing the pores 16, the pore size in which the particulate contaminants may be captured is rendered much smaller, thereby improving the efficiency of the filtering media. Although fiberglass microdiameter fibers are, at present the preferred small diameter fibers subdividing the three dimensional pore structure formed by the large diameter fibers, any fiber having a diameter less than about 3 microns and greater than about 0.5 microns and capable of forming and supporting such a pore structure will achieve the same advantageous filtration capability. The fiberglass fibers are preferred because they are the only fiber presently available with diameters in this range that are available in commercial quantities at a reasonable cost. However, PET fibers having diameters in this microdiameter range are now in pilot plant production, and may become available in commercial quantities. Other such microdiameter fibers having diameters in the range of 0.5 to 3 microns may become available in the future and may be used instead of the small diameter fiberglass.

Another advantage of air laid media is that binder fibers, such as polyester, polyvinyl chloride fibers, or bi-component fibers such as sheath core fibers, may be included in the fiber mixture in order to enhance the moldability of the media. In designing filters, it is often necessary or desirable to mold the media into complex shapes. Accordingly, some of the coarse fibers in the fiber mixture may be replaced by binder fibers, such as KODEL®410 binder fiber available commercially from Eastman Kodak Company. Preferably, a sufficient amount of the coarse fibers are replaced by the binder fiber so that the binder fiber accounts for between 10 and 20% of the total fiber mixture. Such binder fibers have a melting point sufficiently low that they may be heated in a mold to a temperature at which the binder material becomes tacky without affecting the other fibers in the mixture. Accordingly, the media retains the shape imparted to it by the mold. The sheath core fibers have a core spun out of a high melting point polymer such as polyester and have a sheath spun out of a low melting point polymer such as a polyolefin. Bi-component binder fibers having both a high melting point and a low melting point polyamide, polyester, and polyolefin component are also available in almost any combination. While the more common mono-component, copolymer binder fibers tend to melt and encapsulate fiber junctions or melt at random points when activated by heat, bi-component fibers (especially sheath/core fibers) tend to bind the fiber web by the stickiness of the sheath when heated. The core tends to become an integral part of the bonded web structure. Until recently, sheath/core fibers, although available in limited supply, were difficult to obtain and were considerably more expensive than the mono-component binder fibers. Sheath/core fibers are now readily available and are very competitively priced.

It has been found that when the liquid filtrate and the entrained particulate contaminants flow through an air laid filtering medium that charges are induced on the fibers of the medium. The charges on the fibers attract the particulate material and hold the particulate matter on the fibers, thereby increasing filtering efficiency. It has also been found that certain fibers enhance this electrokinetic effect. Accordingly, if desirable, some of the coarse fibers used in the fiber mixture may be replaced by fibers such as fiberglass, nylon, polyolefin, acrylic, and aramid fibers which have been found to increase or enhance the aforementioned electrokinetic effect. One such fiber is a polymer blend fiber disclosed in U.S. patent application Ser. No. 040,446, filed Apr.

20, 1987. Such a composite or polymer blend filter has been used in such air laid filtering media in which the polymer blend consisted of up to 7½% polypropylene and 92½% polyester, each component chosen by its position on a triboelectric classification of materials.

As an example of a typical filtering material pursuant to the invention, a sheet of air laid filtering media weighing approximately 7 ounces per square yard consists of 6 ounces per square yard fiber weight and one ounce per square yard resin weight. The resin may be the aforementioned Union Carbide 828 polyvinyl acetate. Accordingly, the resin weight is about 14.3% of the total, and the fiber mixture is about 85.7% of the total weight of the material. The fiber mixture contains 75% wood pulp fibers, 15% 9 DTEX rayon, and 10% Code 110 fiberglass. When this medium was tested, it was found that both the efficiency and capacity of the filter was almost the same as a wet laid paper filtering media having almost two times the quantity of fiberglass. If desired, a portion of the wood pulp and rayon could be replaced by binder fiber, such as the aforementioned KODEL ®410 such that the KODEL ® make up approximately 15% of the total fiber mixture, in order to enhance moldability of the media.

We claim:

1. An air laid, nonwoven, fibrous filtering medium comprising, in percents by weight, of from about 10% to about 20% of a binder material selected from the group consisting of thermoplastic and thermosetting resins, and from about 80% to about 90% of a fiber mixture, said fiber mixture comprising from about 75% to about 95% of coarse fibers having a diameter of at least 20 microns, said coarse fibers being randomly arrayed in a three dimensional matrix having a relatively large pore size, a substantial percentage of said coarse fibers being oriented in each of the three spatial directions to form said matrix, and from about 25% to about 5% fibers having a diameter less than about 3 microns, said fibers being randomly arranged in all three spatial dimensions within the relatively large pores formed by the coarse fibers to thereby divide the relatively large pores formed by the coarse fibers into substantially smaller pores.

2. An air laid, nonwoven, fibrous filtering medium as claimed in claim 1, wherein said coarse fibers are a mixture of wood pulp fibers and man-made fibers.

3. An air laid, nonwoven, fibrous filtering medium as claimed in claim 1, wherein said fibers having a diameter of less than 3 microns are fiberglass fibers.

4. An air laid, nonwoven, fibrous filtering medium as claimed in claim 2, wherein said fiber mixture comprises, in percents by weight, from about 55% to about 70% wood pulp fibers, from about 5% to about 20% man-made fibers, and from 5% to about 25% fiberglass fibers having a diameter less than three microns.

5. An air laid, nonwoven, fibrous filtering medium as claimed in claim 3, wherein the man-made fibers include binder fibers having a melting point sufficiently low to permit softening of the binder fibers while leaving the remainder of the fibers in the fiber mixture unaffected.

6. An air laid, nonwoven, fibrous filtering medium as claimed in claim 5, wherein said binder fibers are selected from the group consisting of polyester and polyvinyl chloride fibers, and sheath/core bi-component fibers having low melting point polymer and high melting point polymer components.

7. An air laid, nonwoven, fibrous filtering medium as claimed in claim 5, wherein said fiber mixture comprises, in percents by weight, from about 10% to about 20% of said binder fibers.

8. An air laid, nonwoven, fibrous filtering medium as claimed in claim 1, wherein the diameter of said fiberglass fibers is greater than 0.5 microns but less than 3 microns.

9. An air laid, nonwoven, fibrous filtering medium as claimed in claim 1, wherein said fiber mixture included fibers selected from the group consisting of rayon and polyester fibers.

10. An air laid, nonwoven, fibrous filtering medium as claimed in claim 1, wherein said fiber mixture includes fibers which enhance the electrokinetic effect of charges which build on the filtering medium when the fluid being filtered passes through the material.

11. An air laid, nonwoven, fibrous filtering medium as claimed in claim 10, wherein said fibers which enhance the electrokinetic effect are selected from the group consisting of fiberglass, nylon, acrylic, polyolefin, and aramid fibers.

12. An air laid, nonwoven, fibrous filtering medium comprising, in percents by weight, of from about 10% to about 20% of a binder material selected from the group consisting of thermoplastic and thermosetting resins, and from about 80% to about 90% of a fiber mixture, said fiber mixture comprising from about 75% to about 95% of coarse fibers having a diameter of at least about 20 microns and from about 25% to about 5% microdiameter fibers having a diameter of less than about 3 microns, said coarse fiber mixture comprising from about 10% to about 20% of binder fibers having a melting point sufficiently low to permit softening of the binder fibers while leaving the remainder of the fibers in the fiber mixture unaffected, about 55% to about 70% wood pulp fibers, from 0% to about 20% man-made fibers other than binder fibers, said coarse fibers being randomly arrayed in a three dimensional matrix having a relatively large pore size, a substantial percentage of said coarse fibers being oriented in each of the three spatial directions to form said matrix, said fibers having diameters of less than about 3 microns being randomly arranged in all three spatial dimensions within the relatively large pores formed by the coarse fibers to thereby divide the relatively large pores formed by the coarse fibers into substantially smaller pores.

13. An air laid, nonwoven, fibrous filtering medium as claimed in claim 12, wherein the fibers having a diameter of less than about 3 microns are fiberglass fibers.

* * * * *